United States Patent [19]
Fast et al.

[11] Patent Number: 6,117,331
[45] Date of Patent: Sep. 12, 2000

[54] PROCESSES FOR THE PURIFICATION OF WATERS CONTAINING ORGANIC CONSTITUENTS

[75] Inventors: Peter Fast, Hannover; Gerda Grund, Duelmen; John Kahsnitz, Haltern, all of Germany

[73] Assignee: Huels Aktiengesellschaft, Marl, Germany

[21] Appl. No.: 08/820,905

[22] Filed: Mar. 19, 1997

[30] Foreign Application Priority Data

Mar. 19, 1996 [DE] Germany .............................. 196 10 673
Mar. 19, 1996 [DE] Germany .............................. 196 10 676

[51] Int. Cl.[7] ..................................................... C02F 1/28
[52] U.S. Cl. .......................... 210/673; 210/677; 210/692
[58] Field of Search ..................................... 210/663, 669, 210/671, 673, 677, 692, 693, 908, 909, 678

[56] References Cited

U.S. PATENT DOCUMENTS

| | | | |
|---|---|---|---|
| 2,769,751 | 11/1956 | Paull | 196/14 |
| 4,289,505 | 9/1981 | Hardison | 55/59 |
| 5,681,476 | 10/1997 | Grund et al. | 210/692 |

FOREIGN PATENT DOCUMENTS

| | | |
|---|---|---|
| 396 654 | 11/1993 | Austria . |
| 249 190 | 9/1987 | Germany . |
| 42 04 573 | 8/1993 | Germany . |
| 43 29 243 | 3/1995 | Germany . |

*Primary Examiner*—Ivars Cintins
*Attorney, Agent, or Firm*—Oblon, Spivak, McClelland, Maier & Neustadt, P.C.

[57] ABSTRACT

Conventional regenerative adsorptive methods for the purification of waters of organic constituents are limited in their application, when owing to a low content of organic water constituents the loading of the adsorbers is so low that the condensed water vapor desorbate no longer has a tendency to form two phases, or when the organic components are readily water-soluble and thus, following desorption with water vapor, can be separated only with difficulty out of the condensed desorbate. The process of the invention improves the tendency toward phase separation by cycling back the aqueous phase of the desorbate onto a loaded adsorber prior to its desorption in order to increase the loading and reduce, through additional supply of external heat, the required amount of water vapor for desorption. The present process is particularly useful for purification of industrial process waters or ground water.

13 Claims, 4 Drawing Sheets

PROCESSES FOR THE PURIFICATION OF WATERS CONTAINING ORGANIC CONSTITUENTS

BACKGROUND OF THE INVENTION

1. Field of the Invention

The invention relates to a new process for the purification of water containing organic constituents by means of absorber resins and to preferred applications of the process.

2. Description of the Related Art

An adsorptive process is often employed for the purification of ground waters, industrial waste waters or process waters. In so doing, the water to be purified flows through a bed comprising granular adsorbents, leaves the undesired constituents adsorptively bonded on the adsorbent and issues purified out of the bed. Frequently the undesired constituents of the water are organic compounds, which are removed with the aid of polymeric adsorber resins.

Industrial waste waters or process waters, as defined in the above description, are all streams or quantities of water that are related in some way to industrial manufacturing plants or manufacturing processes and that consequently are contaminated with undesired constituents, be it because they themselves are, for example, components of a manufacturing process or that they make only indirect contact with manufacturing processes or plants, for example rain water from tank or installation bays. Such waters are often contaminated with environmentally unacceptable pollutants, often with organic compounds. The object is to remove these substances, except for a small residual concentration, as early as possible in the processing sequence.

By ground waters is understood all forms of ground, surface, rain or seepage water and the like.

In "Neuere Verfahrenstechnologien in der Abwasserreinigung, Abwasser- und Gewässerhygiene", R. Oldenbourg Verlag, Munich, Vienna 1984, pages 235 to 251, several methods for treating waste water, containing chlorinated hydrocarbons, from chlorinating plants are described. According to one method, the waste water is first made alkaline (pH 11). The subsequent stripping, which is done by blowing in water vapor in the countercurrent, results in a distillate that, following condensation, decomposes into a chlorinated hydrocarbon phase and an aqueous phase. The bottom of the stripper (oxistripper) collects waste water, which is then purified biologically.

In special cases waste water, having a pH value ranging from 1 to 2, can also be subjected to stripping with water vapor in the countercurrent. The bottom of this stripper collects water with a high iron and hydrochloric acid content, which is fed to a chemical-mechanical clarification plant for further processing.

In the above-mentioned literature the rain water, containing chlorinated hydrocarbons from plant and tank bays, is purified in an adsorber resin installation. In so doing, the rain water, from which solids have been carefully removed, passes through an adsorber resin, based on a styrene-divinyl benzene copolymer. Then vapor desorption takes places for reactivation. Based on the fact that after application of this process a significant reduction of the adsorber resin activity could be recorded after one year owing to irreversible iron deposits, a new plant with a pH of 1.5 was operated.

According to *Technische Mitteilungen*, vol. 77 (1984), 525–526, styrene copolymers or polyacrylates are suitable for removing aliphatic and aromatic hydrocarbons, chlorinated hydrocarbons, phenols, pesticides and surfactants from waste waters. Thereafter the resin is reactivated with water vapor. In the case of pesticides, however, reactivation occurs with the aid of solvents, like acetone or methanol, or with inorganic chemicals.

In the DD 249 190 hydrochloric acid, which is contaminated with organic substances and which originates from chlorination processes, is purified with the aid of hydrophilic, postreticulated styrene-divinyl benzene copolymers, which exhibit preferably an interior surface ranging from 1,000 to 1,600 $m^2/g$. The resin is reactivated with 130° C. hot water vapor, whereby the bonded organic substances can also be desorbed with solvents, like alcohols and ketones.

The DE-P 44 33 225.4 discloses a process for the purification of ground water of organic components, where, first of all, solid components are removed and then the organic components are adsorbed onto an adsorber resin. Following desorption of the organic components with water vapor, the adsorber resin can be regenerated, if desired, with an acid. Suitable adsorber resins are preferably styrene-divinyl benzene copolymers with a specific surface ranging from 600 to 1,200 $m^2/g$. Desorption with water vapor is done preferably at 100° C. to 150° C. The desorbate, produced from desorption with water vapor, is collected and can be subjected to a phase separation into an aqueous and an organic phase. The separated aqueous desorbate phase can be cycled back and added to the ground water to be purified; the organic phase is extracted from the process. Especially suitable methods for removing inorganic deposits on the resin, caused by inorganic constituents in the water, are known from the DE-P 44 33 225.4.

Finally the DE-A-42 04 573 describes an adsorptive process for the purification of contaminated ground water, seepage water, soil washing water and surface water, in which process the adsorber is supplementally heated by means of the walls of the apparatus or suitable installations; this patent application describes suitable adsorber resins.

In addition to ground water purification, the adsorption of undesired organic constituents by means of reactivatable adsorber resins is also applicable to industrial waste water or process water purification. The goal of such a waste water or process water purification is to reduce the organic constituents in the water to such an extent that the water thus purified can be reused directly or released in a state that is compatible with the environment. Suitable adsorber resins are, for example, the aforementioned styrene-divinyl benzene-based copolymers (e.g. Purasorb AP 250 from the Purolite Corporation or Amberlite XAD-4 from the Rohm and Haas Corporation).

If one looks at only one adsorber at a time, then adsorptive water purification always takes place in cycles, irrespective of the total process. In the adsorption cycle the adsorber resin is loaded first. In so doing, three zones in the adsorber resin can be distinguished in the flow direction: the saturated zone, where the water to be treated enters the adsorber, in which the resin has reached the equilibrium loading, corresponding to the untreated water; the actual adsorption zone, where the loading of the resin declines from the equilibrium value to the residual concentration, remaining following desorption, in the resin (thus the fresh zone value); and the virtually unloaded fresh zone before issuing from the adsorber. As the loading increases, the adsorption zone migrates in the flow direction to the end of the adsorber bed. The width of this transition zone is a function of varying parameters, such as the flow rate of the water to be treated through the adsorber. When the fresh zone is consumed, the adsorber threatens to reach a breakthrough point and the adsorption cycle is ended. The adsorber resin has to be desorbed.

Desorption can take place by different methods, e.g. with the aid of suitable solvents. Another possibility of reactivation, which is preferred for water purification, is to rinse the adsorber bad with water vapor. In so doing, the adsorptively bonded pollutants pass into the water vapor, which is then condensed. With the majority of known applications desorption takes place in this manner with the water vapor ranging from 100° C. to 150° C. To conserve the resin, temperatures are set preferably from 110° C. to 140° C.

In this case the adsorber is usually loaded with demineralized water in order to displace the water to be treated from the resin. Furthermore, the demineralized water is usually continuously heated, especially in plants without supplemental heating of the adsorber, thus mildly raising the adsorber resin to about the desorption temperature. After water vapor desorption the adsorber bad is cooled with demineralized water of falling temperature, in order to avoid damaging the resin by a sudden change in temperature during the cooling process.

It is well-known that the added demineralized water is to be added to the water to be treated. After leaving the adsorber, the water vapor used for desorption is condensed and usually cooled to approximately 35° C. to 25° C. If the desorbed quantity of undesired organic water constituents is greater than can be dissolved in the liquid desorbate at this temperature, two phases are formed (a dry organic phase and an aqueous phase, saturated with organic constituents), which as a rule can be easily separated owing to their different densities. Therefore, the cooled desorbate is usually fed into a phase separator, where gravity separation into an aqueous and an organic phase occurs. The organic phase denotes the concentrated pollutant freight and can be extracted. In contrast, the aqueous phase has to be subsequently treated. It is well-known that this phase, too, is added to the water to be purified and is thus cycled back onto the adsorber bed.

The preparation of the saturated, but pollutant-lean aqueous phase, which accumulates during reactivation, is a critical point that decides the feasibility of the adsorptive water purification process. In the case of contaminated ground water, for example, the loading with undesired constituents is usually far below the saturation limit, so that the admixture of the constituent-lean (but saturated) water phase from the reactivation means a significant dilution of this phase and thus a loss of energy that has an adverse effect on the cost.

Furthermore, the concentration of the undesired constituents, for example, in a ground water, especially toward the end of a purification measure, can be so low that no two phases form in the condensate of the reactivating vapor. The ratio of the volume of constituents, separated off from the raw water, to the volume recirculated in the condensate, becomes increasingly worse. Then an adsorber, which is not reactivated following exhaustion, but rather is disposed and replaced by a fresh one, is often more economical.

The described conventional method of desorption with water vapor also fails when, for example, the adsorbate itself is relatively readily water-soluble and even when subjected to intense cooling the condensate of the reactivating vapor does not separate automatically into am aqueous and an organic phase. Of course, a mass transfer could still be attained by suitable methods (e.g. stripping and the like); yet the cost of such a separating method would have a significant negative effect on the feasibility of adsorptive water purification.

Therefore, to be able to avoid even in such cases the use of other expensive mass transfer or even desorption techniques (e.g. the use of solvents inclusive of the requisite after-treatment steps), the object of the present invention is to improve the phase separation behavior of the desorbate from the water vapor desorption by means of suitable process steps, in order to design adsorptive water purification processes so as to be applicable and/or more economical without additional expense, and especially when the undesired organic constituents in the water to be purified are relatively readily water-soluble or the degree of contamination is (still) quite low.

SUMMARY OF THE INVENTION

The above deficiencies of the prior art processes are overcome in the process of the present invention in which the desorption of the organic constituents adsorbed onto the adsorber resin is accomplished with water vapor; the process in accordance with the present invention which is characterized in that an aqueous phase, which is saturated with organic constituents and separated off from the desorbate following desorption with water vapor of an adsorber, is fed, without the admixture of other water, onto at least one adsorber, which is already loaded with organic constituents by means of the water to be treated in a closed adsorption cycle. This loaded adsorber (or these loaded adsorbers) can be the same adsorber, if desired together with others, originating from the aqueous desorbate phase, as well as one or more other adsorbers that are already loaded. The loading can take place in the cocurrent or in the countercurrent to the flow direction of the water to be purified through the adsorber. Preferably the aqueous phase flows through the adsorber(s) countercurrently to the flow direction of the water to be purified during adsorptive purification.

DESCRIPTION OF THE PREFERRED EMBODIMENTS

Surprisingly the loading of an adsorber with organic constituents can be increased with varying effects by means of the process according to the invention beyond the breakthrough point when loading with the raw water to be treated, so that during the subsequent desorption with water vapor a desorbate accumulates that contains increasingly more organic constituents and exhibits an improved tendency to form two phases.

In many cases, especially, however, with only slightly contaminated water, the concentration of organic constituents in the aqueous phase of the desorbate is higher than in the raw water to be purified. However, the attainable loading of an adsorber resin is, among other things, dependent on the concentration of the constituents to be removed in the raw water to be treated. At otherwise the same conditions this loading increases as the impurities of the water to be treated increase. By feeding, according to the invention, the aqueous phase of the desorbate, which is more contaminated than the raw water, onto an adsorber, loaded only with raw water, the loading of this adsorber can be further increased.

Independent of this effect (or optionally in addition to), the flow rate of the aqueous desorbate phase through the adsorber as compared to the flow rate of the raw water is also preferably decreased according to the invention, namely preferably to approximately 80 to 20% of the rate of the raw water. Even with semi-continuously working multi-bed designs this is usually possible without any problems due to the different quantities of throughput in the different working cycles. Owing to the contact time which is extended in accordance with the reduced flow rate, the width of the adsorption zone (i.e. the transition zone, in which the loading drops from the equilibrium value to the residual value following desorption), is decreased so that the loading increases on the whole. Preferably the adsorption conditions are chosen in such a manner that when the aqueous desorbate phase is cycled back, according to the invention, onto the adsorber, the output concentration of organic constituents in this aqueous phase does not exceed the raw water concentration so that the aqueous desorbate phase, purified by means of recycling according to the invention, can be added to the raw water.

By cycling back, according to the invention, an aqueous phase, which is saturated with organic constituents and which is separated off from the desorbate of a preceding cycle, onto at least one loaded adsorber, whose fresh zone has already been exhausted by the adsorptive water purification and which is just before the breakthrough point, preferably in the countercurrent to the flow direction of the water to be purified, one can also attain an increased loading of the adsorber resin, especially in the region of the transition zone. In this manner the percentage of organic constituents in the desorbate is also increased during subsequent water vapor desorption of the adsorber; and the tendency of the phases to separate when the desorbate is cooled is raised. In this manner an adequate phase separation of the desorbate can be attained through cooling even with relatively readily water-soluble organic constituents in the waters to be purified, thus rendering an adsorptive water purification with water vapor desorption economical.

Preferably the adsorber resin is supplementally heated during desorption. In this manner the amount of water vapor required for desorption can be further reduced.

Another advantage of the process, according to the invention, results from raw water containing such constituents to be purified; upon heating to desorption temperature the raw water deposits solid layers (e.g. incrustations) on the adsorber resin. In this case the raw water has to be displaced from the adsorber by water that does not contain these constituents. Usually demineralized water is used. In the process of the invention the displacement of the water exhibiting a tendency toward depositions is caused by the pollutant-saturated desorbate (FIGS. 4, 4a), so that there is no need to use demineralized water.

Like the adsorptive purification of the water to be treated, the process of the invention, that feeds the aqueous desorbate phase onto a loaded adsorber, is usually conducted at 15° C. to 35° C. and in so doing results, as described, in every case in a higher loading of the adsorbers and an improved phase separation tendency in the condensed desorbate.

To start the process, the first accumulated water vapor desorbate is either cooled to the extent that an aqueous desorbate phase, which can be cycled back, according to the invention, onto a loaded adsorber, can be separated off or the cooled desorbate itself is cycled back onto a loaded adsorber without phase separation. In any case the loading of at least one adsorber that is already loaded in an adsorption cycle is increased so much that during the subsequent desorption of this adsorber a desorbate accumulates that has an increased phase separation tendency and from which an aqueous phase can be obtained through cooling. For water purification measures, such as ground water purification, where the above problems due to decreasing concentrations of undesired constituents do not arise until toward the end of the measure, the problem of the starting phase is eliminated with the process of the invention.

The process of the invention can be implemented continuously or discontinuously in a single bed or multi-bed design configuration. Required is only a simple phase separating apparatus, preferably a gravity separating tank, in which the desorbate is collected after cooling to preferably approximately 0° C. to 35° C. (relevant here is usually the temperature of the available cooling water) especially preferred 3° C. to 15° C., can be put into temporary storage and separated, as desired; required is also suitable equipment for recycling the aqueous desorbate phase according to the invention. Usually a conventional heat transfer medium serves to cool the desorbate, whereby cooling is put into operation preferably only during the desorption cycle.

Figure 1:
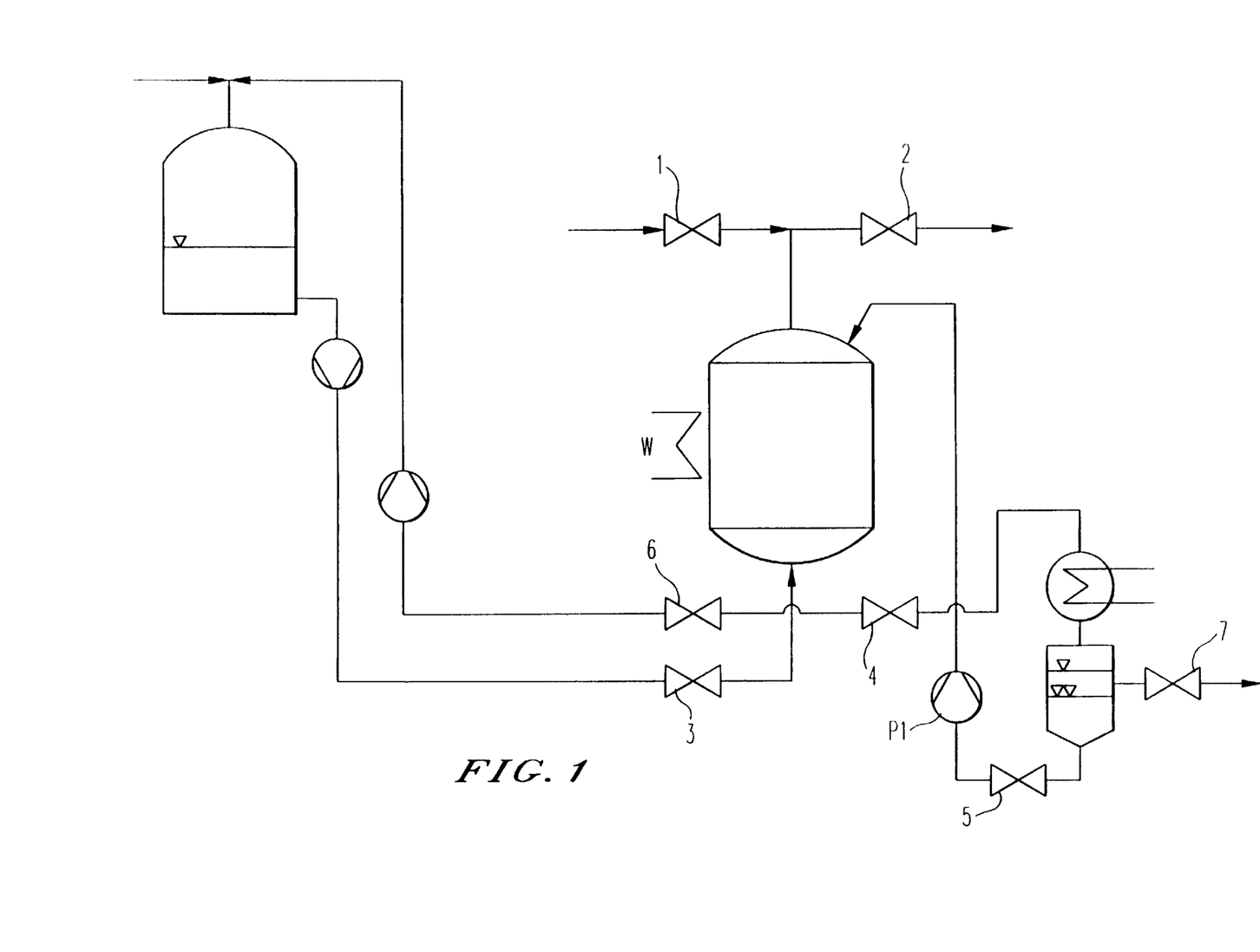
FIG. 1 depicts a single bed design configuration.

The cycled back aqueous desorbate phase feed of the invention can be fed to the water to be purified, preferably as aforementioned after passage, preferably in the countercurrent, through at least one loaded adsorber bed; for example, in a single bed process as in FIG. 1, it can be fed to the supply tank for the water to be purified. However, it can also be cycled back first into the phase separator and from there be admixed preferably with the water to be purified (cf. FIG. 2).

The separated off organic phase from the desorbate represents the concentrated pollutant freight and can be extracted selectively from the process and be disposed of, for example.

In the case of industrial process water or waste water the water purified according to the invention can be cycled back into the processing sequence, used elsewhere or discharged for further clarification. Purified ground water can be cycled back in an environmentally acceptable state or diverted into the preclarifier.

A preferred supplemental heating of the adsorber resin during desorption can reduce the amount of added water vapor to the amount that is needed for desorption of organic constituents and that can be easily determined by the expert in suitable pilot tests. It is expedient to put supplemental heating into operation prior to water vapor desorption in order not to have to heat the resin via the water vapor. Due to the low consumption of vapor the desorbate thus produced contains a higher percentage of organic constituents, by means of which the tendency of the desorbate to form an aqueous and an organic phase is further improved.

The supplemental heating of the adsorber resin takes place preferably by means of a jacket heating of the adsorber or in internally heated serpentine coils embedded in the resin. Suitable heating mediums are in particular water vapor, but also other conventional heat transfer mediums. Even electric heating is possible. In the case of a poor surface to volume ratio in large apparatuses, one may resort to tube bundle apparatuses.

The limits at least of economically meaningful applications of the process according to the invention are usually reached when for specified organic constituents to be removed (with specified water solubility) no adequate phase separation can be achieved by gravity separation or other suitable and economically justifiable methods for phase separation despite the economically still justifiable cooling of the desorbate. Knowing the conventional adsorption methods and the methods according to the invention, the expert can not only determine in a simple manner, e.g. in pilot tests, the limits of application for specified waters to be purified but also optimize the process design. In so doing, the result can also yield limitations for the degree of still tolerable water-solubility of the organic constituents present in the water. Within these limits very low residual concentrations of organic constituents in the water to be treated can be obtained with the aid of the processes according to the invention, the sum of these concentrations being in a magnitude of approximately 10 $\mu$g/l and comparable to the obtained residual concentrations of conventional adsorption processes for water purification.

The high profitability of the process of the invention as compared to that of alternative methods is demonstrated, on the one hand, by the purification of industrial waste waters or production waters, which are loaded at least partially with relatively readily water-soluble organic constituents. However, the process of the invention is also applicable to slightly soluble organic constituents and can also offer advantages depending on the situation (e.g. low starting concentration of the organic constituents contained in the water). The high profitability of the process of the invention compared to that of alternative methods is also demonstrated, on the other hand, especially by the purification of waters, loaded only relatively slightly with organic constituents.

According to the invention, suitable organic constituents are in particular all organics known from chemical processes, especially e.g. aliphatic $C_4$ to $C_{12}$ hydrocarbons, like pentane, hexane, cyclohexane, octane, isooctane or decane; cyclic polyenes, such as cyclopentadiene; aromatic hydrocarbons, like benzene, toluene or xylene; phenols; organic acids; esters and halogenated hydrocarbons. Included are chlorinated hydrocarbons, like chloroform, carbon tetrachloride, 1,2-dichloroethane or 1,2-dichloropropane; bromide hydrocarbons, like bromochloromethane, bromoform or bromobenzene; and chlorofluorocarbon, such as trifluorochloromethane. Furthermore, the water to be treated can contain ethers, such as dibutyl ether, tetrahydrofuran, p-toluyl ether or halogenated aliphatic ethers, such as di(chloroisopropyl)ether or di(chloroethyl)ether, and polycyclic aromatic hydrocarbons, such as naphthalene, acenaphthylene, acenaphthene, fluorene, phenanthrene, anthracene, fluoroanthene, pyrene or chrysene.

The organic constituents can occur individually or in any combination in the water to be purified.

Suitable adsorber resins are primarily styrene-divinyl benzene copolymers, wherein products with a specific surface ranging from 600 to 1,200 $m^2/g$ and especially from 700 to 900 $m^2/g$ are preferred. However, other polymers, which can adsorb preferably neutral organic compounds, can also be used.

The adsorption takes place generally from 15 to 35° C. The desorption with water vapor is conducted usually from 100 to 150° C. To preserve the resin, the temperatures are set preferably from 110 to 140° C.

Since depositions on the resin can occur during adsorptive purification of waters with inorganic constituents and non-adjusted pH value, in this case the inorganic deposits have to be removed, if desired, at regular intervals, cf. DE-P 44 33 225.4. Acids, which can be added to regenerate the adsorber resin, are primarily mineral acids, like hydrochloric acid, sulfuric acid and phosphoric acid. However, strong organic acids, like formic acid and acetic acid, can also be used. Preferably a 10 to 20% hydrochloric acid is added, and regeneration takes place at 20 to 80° C. In so doing, an oxygen-containing gas, preferably air, is introduced in the countercurrent.

Regeneration is not necessary after every adsorption-desorption cycle, but rather only after the adsorptive capacity of the resin has declined. Regeneration is done usually after 30 to 80 cycles, whereby an acidic water requires less frequent regeneration than a neutral water.

When the waters to be created flow through the adsorber resin in a column, for example from the bottom to the top, the water vapor flows in the opposite direction, thus from the top to the bottom, during the desorption phase. During regeneration the oxygen-containing gas is introduced below the resin layer.

Long residence times of the resin are also attained in these cases, since unavoidable precipitations of inorganic deposits on the adsorber resin are removed again by routine rinsing with aqueous acid.

If the waters to be treated contain solid components (e.g. polymerizates), it might be necessary to separate off these components, above all suspended materials, prior to the adsorber through filtration. Suitable filters are primarily sand filters, but also cloth filters and paper filters. In the case of adsorptive purification the water to be purified can be left at its original pH value. Preferably the pH value ranges from 1 to 8, where pH values from 3 to 7.5 are especially preferred. The pH value can also be set so as to be controlled by the adsorptive purification.

The process of the invention is suitable preferably for adsorptive purification of ground waters or industrial process waters or waste waters in the chemical industry.

Figure 2:
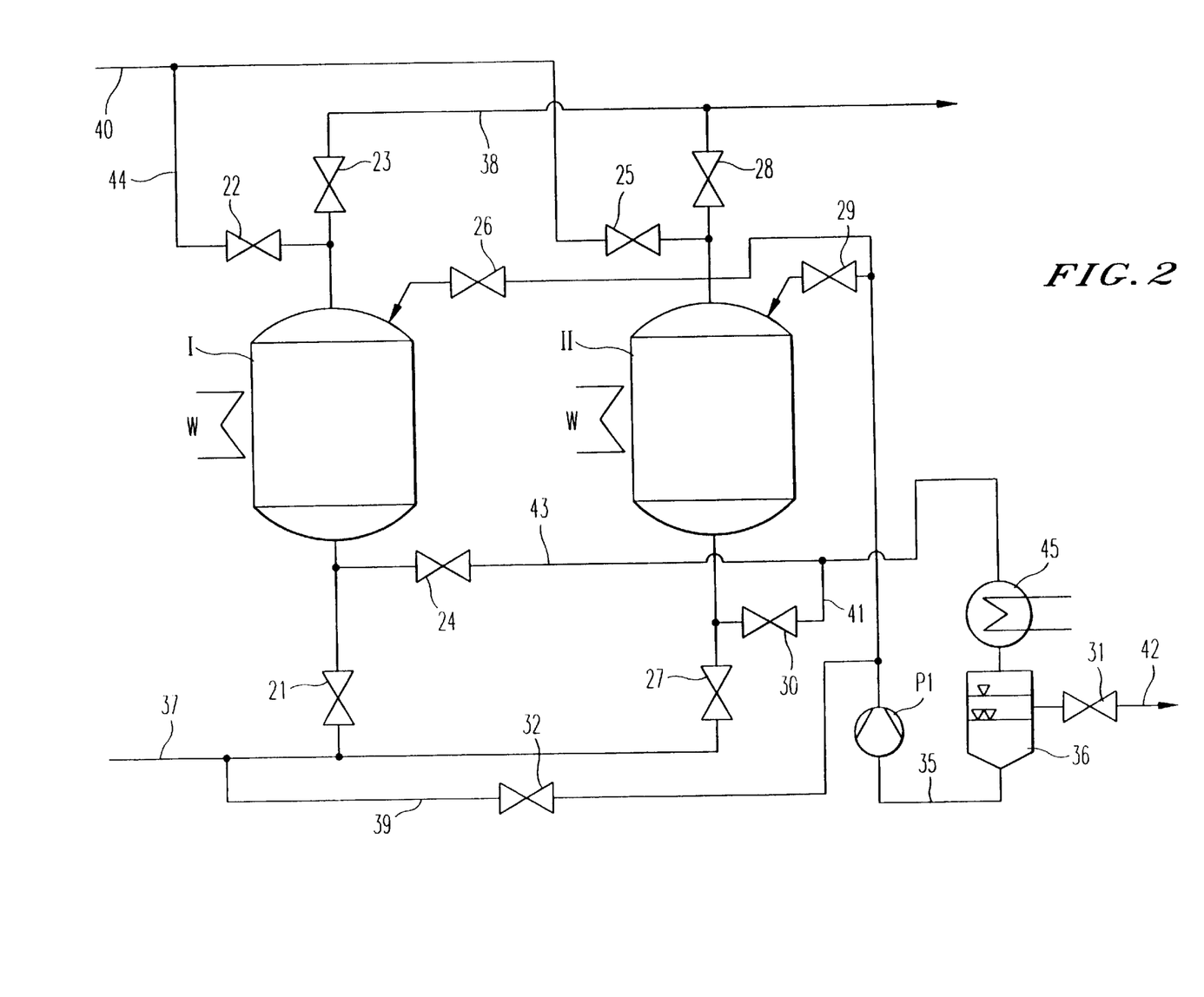
FIG. 2 depicts a dual bed design configuration.

FIGS. 1 and 2 show exemplary design configurations of the process according to the invention, which are described in detail in Examples 1 and 2. FIG. 1 depicts a single bed design configuration; FIG. 2, a dual bed design configuration. In the center of the picture one can see the adsorbers (shaded), which are supplementally heated here by means of electricity, and the direction of the line for the process water to be treated in the adsorption cycle and the direction of the line for the water vapor in the desorption phase. The desorbate passes by means of a heat transfer medium for cooling through the lines marked "vapor outlet" into the gravity separator and is separated there into an organic and an aqueous phase. It is assumed here that the organic phase has a lower density than the aqueous phase. (However, the reverse case is also possible). The organic phase of the desorbate is extracted; the aqueous phase can be cycled back in accordance with the invention from here over the lines "desorbate (aqueous phase)" and fed onto a loaded adsorber bed. As in FIG. 1, the processed aqueous phase that accumulates thereby can be cycled back over valve 6 to the supply tank for the process water to be purified (on the left in FIG. 1); in FIG. 2 said phase is cycled back by means of the heat transfer medium first over valve 4 or 10 into the separating tank and from there over valve 12 to the process water to be purified. Numerals 1 to 7 in FIG. 1 or 1 to 12 in FIG. 2 denote valves that are necessary for controlling the different streams of substances in the various working cycles. The operational sequence of the working cycles is explained in detail in Examples 1 and 2.

Having generally described this invention, a further understanding can be obtained by reference to certain specific examples which are provided herein for purposes of illustration only and are not intended to be limiting unless otherwise specified.

EXAMPLES

Example 1: Single Bed Process

When the volumetric flow rate of an industrial process waste water is low (possibly discontinuous accumulation), a single bed process is applicable for economic reasons (see FIG. 1).

Switching sequence:

Step 1 Adsorption of the industrial process water (Bed I)
Line 8 supplies untreated process water to supply tank 9.
Valve: 2, 3 opened; Pump P2 moves untreated process water from supply tank 9 through line 10 to Bed I from which purified process water is discharged through line 12.
Valve: 1, 4, 5, 6, 7 closed Step 2 Extraction of the organic phase
Valve: 7 opened; Organic phase is discharged from gravity separator 13 through line 15.
Valve: 1, 2, 3, 4, 5, 6 closed Step 3 Adsorption of the aqueous phase of the desorbate
Pump P1 on
Valve: 5, 6 opened; Desorbate aqueous phase exits gravity separator 13 through line 16 to Bed I and process water is returned through line 18 through pump P3 to supply tank 9.
Valve: 1, 2, 3, 4, 7 closed Step 4 Desorption of the bed
Pump P1 off
Heating put into operation
Valve: 1, 4 opened; Water vapor passes through inlet line 11 and water vapor is discharged through line 17 through cooling heat exchanger 14 to gravity separator 13.
Valve: 2, 3, 5, 6, 7 closed
Heating out of operation following completed desorption Thus the cycle is ended; then the adsorption procedure starts again with step 1.

Example 2: Dual Bed Process

When the volumetric rate of flow is higher, thus eliminating the need for continuous purification, one has to resort to the more complex dual bed process (see FIG. 2).

Switching sequence:

Step 1 Adsorption of the process water (bed I), recycling of the aqueous phase of the desorbate (bed II)
Valve: 21, 23, 29, 30 opened; Untreated process water enters absorption Bed I through line 37 and purified process water exits Bed I through line 38. Water vapor discharged through Bed II passes through line 41 through cooling heat exchanger 45 to gravity separator 36, whereupon desorbate aqueous phase discharged from the gravity separator 36 is pumped by pump P1 through line 35 into Bed II.
Valve: 22, 24, 25, 26, 27, 28, 31, 32 closed Step 2 Admixture of the aqueous phase to the process water to be purified
Valve: 21, 23, 32 opened; Untreated process water enters Bed I through line 37 and purified process water exits Bed I through line 38. Desorbate aqueous phase from line 37 is admixed by way of line 39 with untreated process water in line 37.
Valve: 22, 24, 25, 26, 27, 28, 29, 30, 31 closed Step 3 Adsorption of the process water (bed I), desorption (bed II)
Heating of bed II put into operation
Valve: 21, 23, 25, 30 opened; Untreated process water enters Bed I through line 37 and purified process water exits Bed I through line 38. Water vapor enters Bed II through line 40 and water vapor exits Bed II through line 41 whereupon it is cooled in heat exchanger 45 and enters gravity separator 36.
Valve: 22, 24, 26, 27, 28, 29, 31, 32 closed Step 4 Adsorption of the process water (bed I), cooling (bed II)
Phase separation and extraction of the organic phase (B1)
Heating of bed II put out of operation
Valve: 21, 23, 31 opened; Untreated process water enters Bed I through line 37 and purified process water exits Bed I through line 38. Desorbate organic phase exits gravity separator 36 through line 42.
Valve: 22, 24, 25, 26, 27, 28, 29, 30, 32 closed Step 5 Adsorption of the process water (bed II), recycling of the aqueous phase of the desorbate (bed I)
Valve: 24, 26, 27, 28 opened; Untreated process water enters Bed II through line 37 and purified process water exits Bed II through line 38. Organic contaminant containing water from Bed I, through line 43, passes through cooling heat exchanger 45 and passes into gravity separator 36 while desorbate aqueous phase pumped by Pump 1 through line 35 enters Bed I.
Valve: 21, 22, 23, 25, 29, 30, 31, 32 closed Step 6 Admixture of the aqueous phase to the process water to be purified
Valve: 27, 28, 32 opened Desorbate aqueous phase pumped by pump P1 through line 35 admixes with untreated process water in line 37 which enters Bed II and purified process water exits Bed II through line 38.
Valve: 21, 22, 23, 24, 25, 26, 29, 30, 31 closed Step 7 Adsorption of the process water (bed II), desorption (bed I)
Heating of bed I put into operation
Valve: 22, 24, 27, 28 opened Water vapor enters Bed I through lines 40 and 44 and water vapor is discharged from Bed I through line 24 to gravity separator 36. Simultaneously untreated process water enters Bed II through line 37 and purified process water exits Bed II through line 38.
Valve: 21, 23, 25, 26, 29, 30, 31, 32 closed Step 8 Adsorption of the process water (bed II), cooling (bed I)
Phase separation and extraction of the organic phase (B1)
Heating of bed I put out of operation
Valve 27, 28, 31 opened; Untreated process water enters Bed II through line 37 and purified process water exits Bed II through line 38. Simultaneously desorbate organic phase exits gravity separator 36 through line 42.
Valve: 21, 22, 23, 24, 25, 26, 29, 30, 32 closed Thus the cycle is ended; then the adsorption procedure starts again with step 1.

Example 3: Process Water Purification

According to FIG. 1, a contaminated process water was passed through a solid filter onto an adsorber (diameter 4.4 cm, height 1.5 m). Adsorption was conducted at 20° C., a volumetric flow rate of 20 l/h on the resin Purasorb AP 250 available from Purolite. According to the invention, the aqueous phase of a desorbate was cycled back onto the loaded adsorber. This represents the state following completed adsorption and subsequent concentration of the pollutant freight on the adsorbent (end of step 3 of the single bad process or step 1 or 5 of the dual bed process).

The impurities of the process water were alkylated cyclic ethers, such as methyltetrahydrofuran, and chlorinated cyclic acetals, like 2-(chloromethyl)-1,3-dioxolane.

Desorption:

the bed was heated electrically with the jacket to $T_{RESIN}$ of approximately 130° C., after opening the output valve a 2-phased desorbate solution was obtained that contained up to 30% by weight of the pollutant freight (in the organic phase), the vapor was metered very slowly with a mass flow of approximately 10 g/min for about 70 minutes, in order to desorb the residual freight (loading).

The desorbate was collected in a gravity separating tank and separated into an aqueous and an organic phase. The aqueous phase was further treated according to the invention. The organic phase was extracted.

If the vapor consumption (V) is compared during desorption with and without preceding electric heating, the following values are obtained for the aforementioned adsorption:

with heating of the bed, V=515 g vapor/1 kg resin without heating of the bed, V=1,670 g vapor/1 kg resin In both cases the temperature of the resin during desorption was approximately 140° C.

Figure 3:
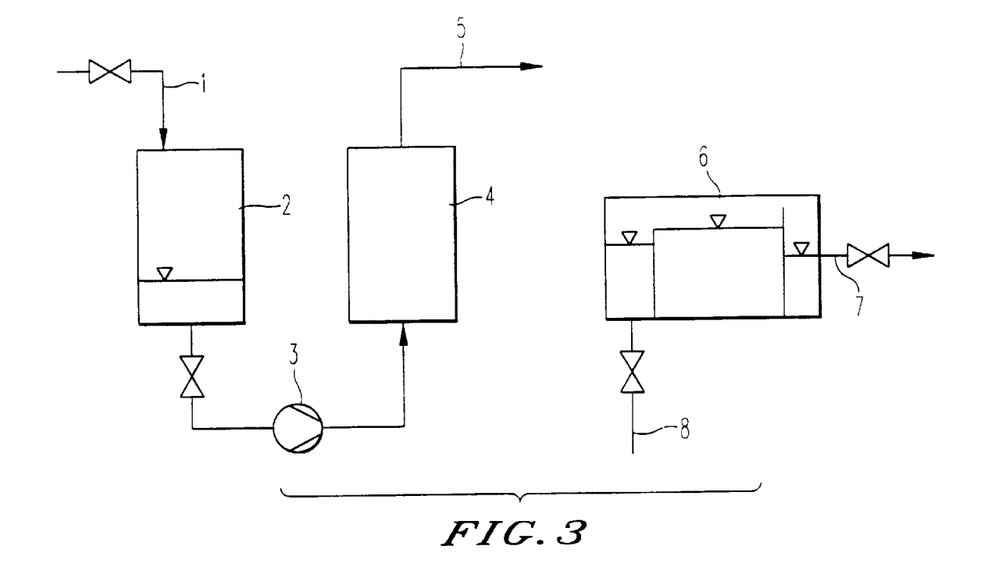
FIGS. 3, 4, 4a and 5 depict a process in accordance with Examples 4 and 5.
Figure 4:
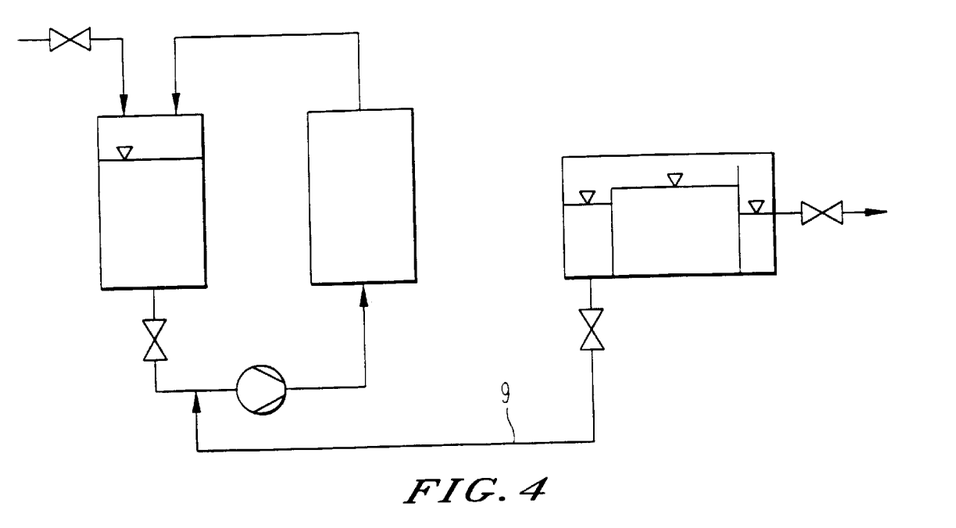
Figure 4A:
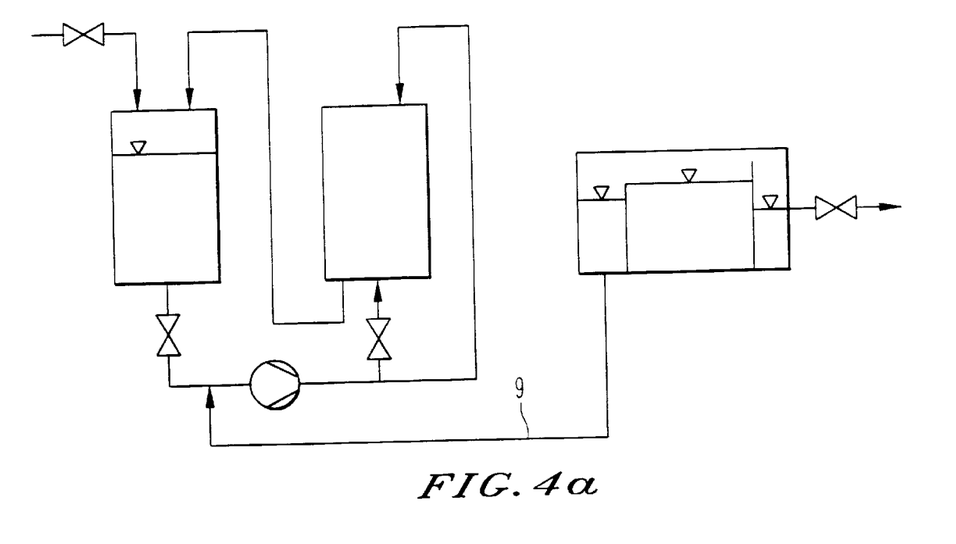
Figure 5:
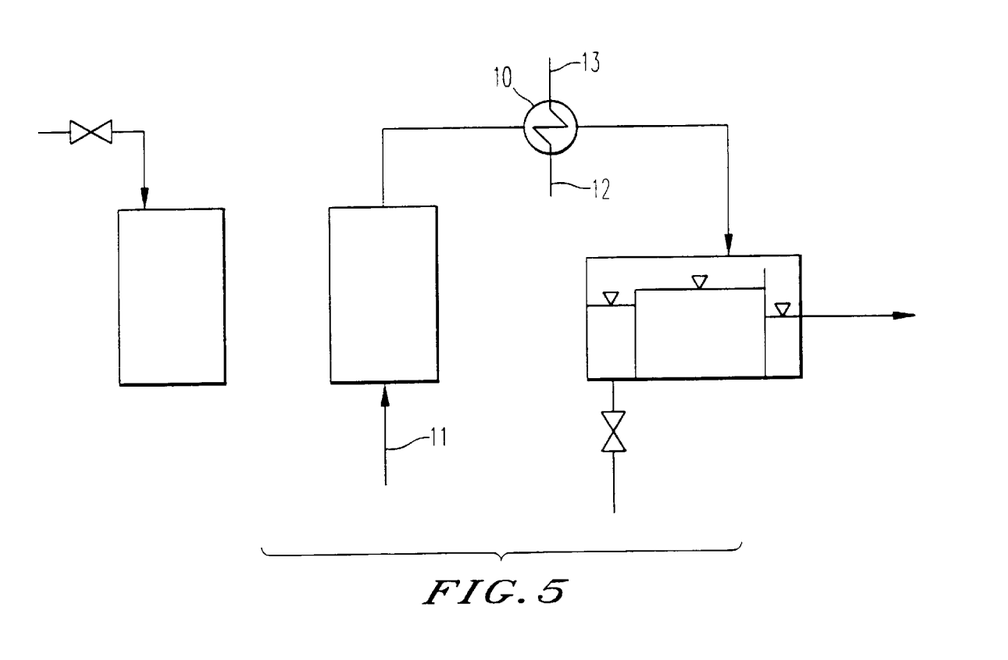

(The following Examples 4 and 5 relate to FIGS. 3 to 5).

Example 4

A water, contaminated by halogenated hydrocarbons (as pollutants) with 150 mg/l [raw water (1)], passes at a volumetric flow rate of 160 m³/h through a fixed bed (4), which contains 11,000 kg of an adsorbent (a macroporous polymeric adsorber resin, such as Amberlite XAD-4 from the Rohm and Haas Corporation) (see FIG. 3). After about 6 hours, the concentration of hydrocarbons begins to increase in the issuing water [pure water (5)]. The inflow of raw water is interrupted. The loading of the adsorbent with pollutants is at this time $$6h·160\ m^3/h·150\ mg/l·1,000\ l/m^3=144\ kg.$$

This is equivalent to 1.31% of the mass of the adsorbent.

Now 25 m³ of condensate, which is saturated with pollutants (approximately 2,500 mg/l) and which accumulated as the lighter phase (8) in the gravity separator (6) during the preceding regeneration and was stored, passes through the fixed bed into the raw water receiver (2) in one hour. Depending on whether the condensate passes through the bed in the same (FIG. 4) or opposite direction (FIG. 4a) as the raw water, the issuing water has a lower or approximately identical concentration as the raw water. Following passage of the condensate, the loading of the adsorbent is approximately $$144\ kg+25\ m^3·2,500\ mg/l·1,000\ l/m^3=206.5\ kg.$$

This is equivalent to 1.88% of the mass of the adsorbent.

Finally the fixed bed is reactivated by the known method with vapor (FIG. 5). In so doing, 144 kg of the pure pollutant phase and 25,000 kg of the condensate with a 2,500 mg/l pollutant content is obtained.

Example 5

160 m³/h of raw water also flow through the fixed bed (4) from the first example. However, the pollutant concentration of halogenated hydrocarbons is 5 mg/l. The bed is exhausted after 6 hours. The freight of the bed is then 4.8 kg, corresponding to 0.044% of the mass of the bed. During the preceding reactivation, 15 m³ of condensate accumulated with 2,500 mg/l, which pass now, as in example 1, cocurrently (FIG. 4) or countercurrently (FIG. 4a) through the fixed bed. The issuing water has a pollutant concentration that is less (cocurrent) than the raw water concentration or is approximately just as high (countercurrent) as the raw water concentration is. Following passage of the condensate, the loading of the adsorbent is approximately $$4.8\ kg+15\ m^3·1,000\ l/m^3·2,500\ mg/l=42.3\ kg,$$

which is equivalent to 0.38% of the mass of the fixed bed. Finally the bed is regenerated with vapor by the known method, whereby 4.8 kg of the pure pollutant phase and 15,000 kg of the saturated, aqueous phase collect with 2,500 mg/l pollutants in the gravity separator.

Reference Numerals to FIGS. 3 to 5

1 raw water feed
2 raw water receiver
3 raw water pump
4 adsorber
5 clean water outlet
6 gravity separator
7 pollutant phase for disposal
8 pollutant-saturated, aqueous phase
9 recirculation of aqueous phase
10 condenser and subcooler
11 vapor feed
12 cooling water feed
13 cooling water discharge
⋈ open valve
⋈ closed valve

What is claimed as new and is desired to be secured by Letters Patent of the United States is:

1. A process for the purification of water, comprising:
   i) passing water containing organic constituents through at least one adsorber resin in at least one vessel;
   ii) adsorbing said organic constituents onto said at least one adsorbing resin;
   iii) terminating the passage of water containing organic constituents to said at least one adsorber resin;
   iv) feeding an aqueous phase having an organic constituent concentration greater than the concentration of organic constituents in said water of step (i) onto said at least one adsorber resin which is already loaded with organic constituents from the purification of said water containing organic constituents, thereby increasing the load of organic constituents on the loaded adsorber resin to a greater extent than the loading of the resin possible with the passage of water containing organic constituents through the adsorber resin bed, and passing the resulting aqueous eluate obtained upon adsorption to said organic constituent containing water of step (i), which aqueous phase is obtained by:

a) desorbing said organic constituents from the at least one adsorber resin of step (iv) with water vapor to form an aqueous desorbate, and b) separating the aqueous desorbate into an organic phase and said aqueous phase; and v) resuming the passing of water containing organic constituents in the manner of step (i) to said at least one adsorber resin for continued water purification.

2. The process of claim 1, wherein said aqueous phase is fed through the at least one adsorber resin countercurrently to the flow direction of the water containing said organic constituents of step (i).

3. The process of claim 1, wherein the at least one adsorber resin is heated during the water vapor desorption.

4. The process of claim 3, wherein the adsorber resin is heated electrically.

5. The process of claim 3, wherein the adsorber resin is heated by water vapor.

6. The process of claim 3, wherein the adsorber resin is heated by separate circulation of a heat transfer medium.

7. The process of claim 3, wherein heating of the adsorber resin is effected by a jacket surrounding said vessel containing said adsorber resin, by a heated serpentine coil in the vessel containing the adsorber resin, or both.

8. The process of claim 1, wherein the flow rate of the aqueous phase through the adsorber resin is less than the flow rate of the water containing said organic constituents.

9. The process of claim 1, wherein said desorbate, is cooled until the formation of an organic and an aqueous phase and wherein the organic and the aqueous phase are separated in a gravity separator.

10. The process of claim 1, wherein the adsorber resin is a styrene-divinyl benzene copolymer with a specific surface ranging from 600 to 1,200 $m^2/g$.

11. The process of claim 1, wherein said desorbing takes place at 100 to 150° C.

12. The process of claim 1, wherein said desorbing takes place at 110 to 140° C.

13. The process of claim 1, wherein said water containing organic constituents is ground water, industrial process water or chemical waste water.

* * * * *